(12) United States Patent
Xu et al.

(10) Patent No.: US 12,103,058 B2
(45) Date of Patent: Oct. 1, 2024

(54) HEAT PIPE-ENHANCED HEAT ACCUMULATION TYPE INDIRECT THERMAL DESORPTION-BASED SOIL REMEDIATION DEVICE AND METHOD

(71) Applicants: NANJING TECH UNIVERSITY, Jiangsu (CN); CSSC NANJING LUZHOU ENVIRONMENT PROTECTION CO., LTD., Jiangsu (CN); NANJING INSTITUTE OF ENVIRONMENTAL SCIENCES, MINISTRY OF ECOLOGY AND ENVIRONMENT OF THE PEOPLE'S REPUBLIC OF CHINA, Jiangsu (CN)

(72) Inventors: Haitao Xu, Nanjing (CN); Yongxian Zhou, Nanjing (CN); Shengtian Zhang, Nanjing (CN); Xiang Ling, Nanjing (CN); Jisai Chen, Nanjing (CN); Haiyan Qin, Nanjing (CN); Xiaofeng Wang, Nanjing (CN); Sun Hu, Nanjing (CN)

(73) Assignees: NANJING TECH UNIVERSITY, Nanjing (CN); CSSC NANJING LUZHOU ENVIRONMENT PROTECTION CO., LTD., Nanjing (CN); NANJING INSTITUTE OF ENVIRONMENTAL SCIENCES, MINISTRY OF ECOLOGY AND ENVIRONMENT OF THE PEOPLE'S REPUBLIC OF CHINA, Nanjing (CN)

( * ) Notice: Subject to any disclaimer, the term of this patent is extended or adjusted under 35 U.S.C. 154(b) by 352 days.

(21) Appl. No.: 17/542,125

(22) Filed: Dec. 3, 2021

(65) Prior Publication Data
US 2022/0176423 A1    Jun. 9, 2022

(30) Foreign Application Priority Data

Dec. 8, 2020   (CN) .......................... 202011423950.7

(51) Int. Cl.
*B09C 1/06*        (2006.01)
(52) U.S. Cl.
CPC ..................................... *B09C 1/06* (2013.01)
(58) Field of Classification Search
CPC ....................................................... B09C 1/06
(Continued)

(56) References Cited

U.S. PATENT DOCUMENTS 8,069,581 B2 * 12/2011 Ha ........................... F23G 5/20
34/79
2017/0136510 A1   5/2017 Shen et al.

FOREIGN PATENT DOCUMENTS

CN        102029287 B    6/2012
CN        104438313 A    3/2015
(Continued)

*Primary Examiner* — Sean D Andrish
(74) *Attorney, Agent, or Firm* — Oliff PLC

(57) ABSTRACT

The present invention discloses a soil remediation device and method. Soil is remediated by (i) introducing hot air at 550-650° C. from an outlet of an air heater into the drum from a circulating hot air inlet of a discharge end fixed hood and transferring heat with the soil by direct countercurrent contact such that the soil is heated, and (ii) releasing heat from a heat accumulator at a bottom of the drum through heat pipes such that the soil is heated. As a temperature of the soil gradually rises to about 300-500° C., water and organic contaminants in the soil are volatilized into a gaseous state and carry dust to become thermal desorption offgas that is separated from the soil, the thermal desorption offgas becoming part of the hot air and flowing from the (Continued)

drum to a dust remover. Part of the hot air is recirculated to the drum, and another part of the hot air is discharged after being purified.

10 Claims, 2 Drawing Sheets

(58) Field of Classification Search
USPC .......................................... 405/128.8, 128.85
See application file for complete search history.

(56) References Cited

FOREIGN PATENT DOCUMENTS

| | | | |
|---|---|---|---|
| CN | 207463803 U | | 6/2018 |
| CN | 110479748 | * | 11/2019 |
| CN | 209849537 U | | 12/2019 |
| CN | 110548759 B | | 7/2020 |
| CN | 211938413 U | | 11/2020 |
| WO | 2018/096663 A1 | | 5/2018 |

* cited by examiner

HEAT PIPE-ENHANCED HEAT ACCUMULATION TYPE INDIRECT THERMAL DESORPTION-BASED SOIL REMEDIATION DEVICE AND METHOD

TECHNICAL FIELD

The present invention belongs to the technical field of soil remediation in contaminated sites, is applicable to remediation of soil in organic contaminated sites, and particularly relates to a heat pipe-enhanced heat accumulation type indirect thermal desorption-based soil remediation device and method.

BACKGROUND

Soil refers to the loose surface layer with fertility and capable of growing plants on the land surface. When harmful substances discharged into the soil exceed the self-decontamination capacity of the soil, the composition, structure and functions of the soil will change. Microbial activities are inhibited, and the harmful substances or decomposition products thereof gradually accumulate in the soil and are indirectly absorbed by human bodies through "soil→plant→human body" or through "soil→water→human body" to a level that harms human health, thus causing soil contamination.

At present, heavily contaminated sites mainly include chemical plants, pesticide plants, smelters, gas stations, chemical storage tanks, etc. Main contaminants of such sites are organic contaminants, which can be divided into volatile organic compounds, semi-volatile organic compounds, persistent organic compounds and pesticides according to their different melting and boiling points. Remediation techniques of such contaminated soil include incineration (cement kiln co-disposal), phytoremediation, bioremediation, chemical remediation, thermal desorption, etc. The thermal desorption technique has the advantages of high treatment efficiency, short remediation period, movable devices and the like, and is widely used in remediation of volatile/semi-volatile organic contaminated sites. According to US EPA statistics, thermal desorption accounts for 20-30% of the site remediation cases in Europe and America, thus being one of the main site remediation techniques.

According to the thermal desorption technique, the contaminated soil is heated directly or indirectly by high-temperature flue gas generated by combustion to the target temperature or above, and by controlling the system temperature and material residence time, the organic contaminants are selectively gasified and volatilized such that they are separated and removed from soil particles.

Contaminated soil is distributed all over China, and equipment needs to be frequently disassembled and assembled and shift among sites in order to achieve reuse of the equipment. Considering the mounting, transportation and dismounting of the equipment, skid-mounted unit integration is required, and the unit structure size generally does not exceed 3 m×3 m×12 m. At the same time, generally, there are several thousand tons to several hundreds of thousand tons of contaminated soil to be remediated in contaminated sites, and the remediated land is in urgent need of redeveloping real estate, so the remediation equipment is required to have high treatment efficiency and high capacity to shorten the remediation period. Therefore, by making full use of the limited space size, the higher the treatment capacity of the equipment, the more beneficial it is to reduce the cost and shorten the working period. The thermal desorption treatment capacity is mainly limited by the thermal desorption reactor, so it is of great significance to increase the heat transfer capacity per unit volume of the reactor based on the heat transfer characteristics of thermal desorption.

At present, according to different manners in which the high-temperature flue gas heats the soil, there are two techniques: direct thermal desorption and indirect thermal desorption.

Application No. CN201010598161.7 has disclosed a drum-type countercurrent thermal desorption system for organic contaminated soil, which includes a soil feeding system. The soil feeding system and a heat source system are connected with a countercurrent thermal desorption system. The countercurrent thermal desorption system is sequentially connected with a dust removal system, a cooling system and an activated carbon adsorption system. Control ends of the above subsystems are connected with a control system. Hot air enters a countercurrent thermal desorption drum through an ignition system, and contaminated soil enters the countercurrent thermal desorption drum through a soil conveyor. The hot air contacts the soil from an opposite direction, such that the organic contaminants contained in the soil are heated and volatilized. Application No. CN201910814270.9 has disclosed a rotary thermal desorption kiln, device and process for thermal desorption of organic contaminated soil. The rotary thermal desorption kiln includes a thermal desorption chamber for accommodating organic contaminated soil and performing thermal desorption on the organic contaminated soil, and a combustion chamber for combusting organic gases generated by thermal desorption, both of which are separate chambers in the rotary thermal desorption kiln. A gas channel is communicated between the thermal desorption chamber and the combustion chamber. The gas channel runs through a kiln head hood and a kiln tail hood. These two patents disclose typical direct thermal desorption structure systems. In these systems, although the hot air contacts the contaminated soil in the thermal desorption drum from an opposite direction, there is only one way for heat transfer, namely heat transfer by contact, so the heat transfer manner is restricted and the heat transfer capacity per unit volume of the reactor is not high. After the high-temperature flue gas and the gas generated by soil heating are mixed together, a large amount of offgas needs to be purified. Moreover, the large amount of offgas needs to be treated firstly at a high temperature of 1100-1200° C. in a secondary combustion chamber, resulting in long treatment procedure, large equipment scale, high energy consumption, high investment cost and high use cost.

Application No. CN201920224738.4 has disclosed a rotary indirect thermal desorption device and system. The device includes a kiln head, a kiln tail, a rotary drum body, a combustion chamber, a feed port, a discharge port and a chimney. The kiln head, the rotary drum body and the kiln tail are sequentially connected. The combustion chamber is sleeved on the rotary drum body. The chimney is disposed on the combustion chamber. The feed port is disposed on the kiln head. The discharge port is disposed on the kiln tail. The kiln head is further provided with an exhaust port. A bottom of the combustion chamber is provided with a plurality of combustors. Application No. CN201721044803.2 has disclosed an external heating type thermal desorption rotary kiln, which includes a furnace tube and a hearth hermetically isolated from each other. One end of the furnace tube is provided with a feed end, and the other end is provided with a discharge end. The hearth covers the outside of the furnace tube between the two ends and provides heat for the furnace tube. Application No. CN201510207851.8 has disclosed a two-section auger indirect thermal desorption device, which includes an upper skid and a lower skid arranged up and down. An upper thermal desorption chamber, a feed hopper, a feed air lock, an air preheater, a blower, a first quench spray tower, a second quench spray tower, a demisting tower and an induced draft fan are disposed in the upper skid. A lower thermal desorption chamber, an activated carbon filter tank, a combustion chamber, a discharge hopper and a discharge air lock are disposed in the lower skid. A first auger is disposed in the upper thermal desorption chamber. An upper flue gas jacket is sleeved outside the upper thermal desorption chamber. A second auger is disposed in the lower thermal desorption chamber. A lower flue gas jacket is sleeved outside the lower thermal desorption chamber. These three patents disclose typical indirect thermal desorption systems and reactor structures. Although skid-mounted unit integration is realized, there is only one way for heat transfer, that is, heat transfer from high-temperature flue gas to contaminated soil through a reactor shell, so the heat transfer capacity per unit volume of the reactor is very low. Especially, limited by the principle of indirect heat transfer and the scale of equipment, the heat transfer area is small and the heat transfer efficiency is low. The treatment capacity of the equipment is usually only about 3-4 tons per hour.

SUMMARY

In view of the defects in the prior art, the present invention provides a heat pipe-enhanced heat accumulation type indirect thermal desorption-based soil remediation device and method.

The Objective of the Present Invention can be Achieved by the Following Technical Solutions:

Provided is a heat pipe-enhanced heat accumulation type indirect thermal desorption-based soil remediation device. The remediation device includes a thermal desorption reactor, a dust remover, a hot air circulating fan and a hot air heater. The thermal desorption reactor is sequentially connected with the dust remover, the hot air circulating fan and the hot air heater to form a hot air circulation loop. A combustion device is sequentially connected with the hot air heater and a chimney to form a flue gas passage. An offgas purifying device is sequentially connected with an induced draft fan and an exhaust funnel to form an offgas purifying passage.

In the device, the thermal desorption reactor includes a feeding device, a feed end fixed hood, a drum and a discharge end fixed hood. The feeding device, the drum and the discharge end fixed hood are sequentially communicated to form a soil channel. The feed end fixed hood, the drum and the discharge end fixed hood are sequentially communicated to form a hot air channel in the reactor. The hot air channel is communicated with the soil channel in the drum. The feeding device is provided with a raw soil inlet. The feed end fixed hood is provided with a circulating hot air outlet. The discharge end fixed hood is provided with a circulating hot air inlet and a treated soil outlet. The drum rotates around a central axis, and the rest parts are fixed.

In the device, an included angle between an axis of a drum body of the drum and a horizontal plane is 1-6°. The drum includes an outer heat insulation layer, an inner heat accumulator and heat pipes partially inserted into the heat accumulator. An inside of the heat accumulator forms a cylindrical cavity that is a space where circulating hot air undergoes heat transfer and thermal desorption reaction with soil. The heat pipes are uniformly distributed along circumferential and axial directions of the drum body, and a distance between every two adjacent heat pipes is greater than a maximum particle size of the soil.

In the device, an inner cavity of the drum body of the drum has a diameter of 1.5-2 m and a length of 8-12 m. The heat insulation layer has a thickness of 80-120 mm, the heat accumulator has a thickness of 20-30 cm, and the heat pipes have a diameter of 2-5 cm, a length of 45-55 cm and a spacing of 1-15 cm. Preferably, the heat accumulator is composed of alumina ceramics, silicon nitride ceramics or silicon carbide ceramics.

In some preferred technical solutions, the heat pipes are vertically inserted into the heat accumulator by ⅓-⅔ of the length.

In some specific implementations, a shell of the heat pipe is made of austenitic stainless steel, a working fluid is mercury, an inside negative pressure is $(0.5-1.5)*10^{-4}$ Pa, and a working temperature is 250-650° C.

Provided is a heat pipe-enhanced heat accumulation type indirect thermal desorption-based soil remediation method. In the method, contaminated soil is conveyed by a feeding device to a feed end of a drum and heated in two manners. In the first manner, hot air at 550-650° C. from an outlet of a hot air heater enters the drum from a circulating hot air inlet of a discharge end fixed hood and transfers heat with the contaminated soil by direct countercurrent contact such that the contaminated soil is heated. In the second manner, a heat accumulator at a bottom of the drum releases heat through heat pipes such that the contaminated soil is heated. As the temperature of the contaminated soil gradually rises to about 300-500° C., water and organic contaminants in the soil are volatilized into a gaseous state and carry dust to become thermal desorption offgas that is separated from the solid soil, and the treated soil is discharged from a treated soil outlet of the discharge end fixed hood.

In the method, a cross section of the drum is divided into a heat release zone and a heat accumulation zone based on the horizontal line. A temperature of the heat accumulator located at the bottom heat release zone is higher than the soil temperature, and heat is transferred to the soil through the heat pipes such that the temperature drops to be close to the soil temperature. A temperature of the heat accumulator located at the top heat accumulation zone is lower than the hot air temperature, and the heat pipes transfer heat of the hot air to the heat accumulator such that the temperature of the heat accumulator rises to be close to the hot air temperature. As the drum rotates around a central axis, the heat accumulator performs heat accumulation and heat release cycles through the heat pipes such that the heat of the hot air is transferred to the soil.

In the method, the thermal desorption offgas generated by the contaminated soil being heated inside the drum of a thermal desorption reactor serves as an initial source of circulating hot air. The hot air flows from a circulating hot air outlet of a feed end fixed hood to a dust remover and is subjected to dust removal and driven by a hot air circulating fan, a large part of the hot air is heated to 550-650° C. by the hot air heater through indirect heat exchange, returns to the inside of the drum from the circulating hot air inlet of the discharge end fixed hood, transfers heat with the contaminated soil by direct contact while heating the heat accumulator through the heat pipes such that the temperature drops to 200-300° C., and carries thermal desorption gas generated by the contaminated soil being heated, a part continues to be reused in a hot air circulation loop, and the remaining part is discharged after being purified.

In the method, fuel is combusted in a combustion device to generate high-temperature flue gas at 950-1050° C., and the high-temperature flue gas undergoes indirect heat exchange with the circulating hot air through the hot air heater such that the temperature drops to about 300° C., and then is discharged to the atmosphere from a chimney. The high-temperature flue gas does not directly contact the circulating hot air.

In the method, with continuous treatment of the soil, the thermal desorption offgas is generated continuously, the circulating hot air carries the thermal desorption offgas and is mixed with the thermal desorption offgas such that the amount of gas increases, 60-90% of the gas in the drum is reused as the circulating hot air, and the remaining gas branches from the outlet of the hot air circulating fan and is discharged after being purified by an offgas purifying device.

In the method, a rotating speed is 0.4-10 r/min, and a soil filling factor in the drum body does not exceed 0.25.

In the technical solution of the present invention, the heat pipe is composed of a shell, a working fluid, a wick and an end cover. The inside of the pipe is evacuated into a negative pressure and then filled with a proper amount of the working fluid. Under the action of gravity, a lower end of the pipe is an evaporation heat absorption section and an upper end is a condensation heat release section. The functions of the two ends can be exchanged as the pipe is turned upside down. By utilizing the principle of heat conduction and the phase-change rapid heat transfer properties of the working fluid, the heat pipe is a heat transfer element whose heat conductivity exceeds the heat conductivity of any known metal.

Beneficial Effects of the Present Invention are as Follows

The present invention discloses a heat pipe/ceramic heat accumulation type indirect thermal desorption-based soil remediation system and method. On the one hand, by using thermal desorption gas generated by soil through heating and volatilizing as a heat transfer medium and by a circular heating manner, hot air efficiently transfers heat to the soil by contact, so the treatment capacity of equipment is high. Moreover, high-temperature flue gas is kept from direct contact with the soil, so the high-temperature flue gas is prevented from being mixed with gaseous organic contaminants. Therefore, only a small amount of excess gas needs to be purified, so the equipment scale is small. On the other hand, by equipping a reactor with heat pipes and a ceramic heat accumulator, a second soil heating manner is provided, so that the heat transfer capacity per unit volume of the reactor is increased, and the treatment efficiency is significantly improved under the same scale.

In the figures, 1 represents thermal desorption reactor, 2 represents dust remover, 3 represents hot air circulating fan, 4 represents hot air heater, 5 represents combustion device, 6 represents chimney, 7 represents offgas purifying device, 8 represents induced draft fan, 9 represents exhaust funnel, 10 represents feeding device, 11 represents feed end fixed hood, 12 represents drum, 13 represents discharge end fixed hood, 14 represents heat pipe, 15 represents ceramic heat accumulator, and 16 represents heat insulation layer.

DETAILED DESCRIPTION

The present invention is further described below with reference to the embodiments, but the protection scope of the present invention is not limited thereto.

Embodiment 1

Figure 1:
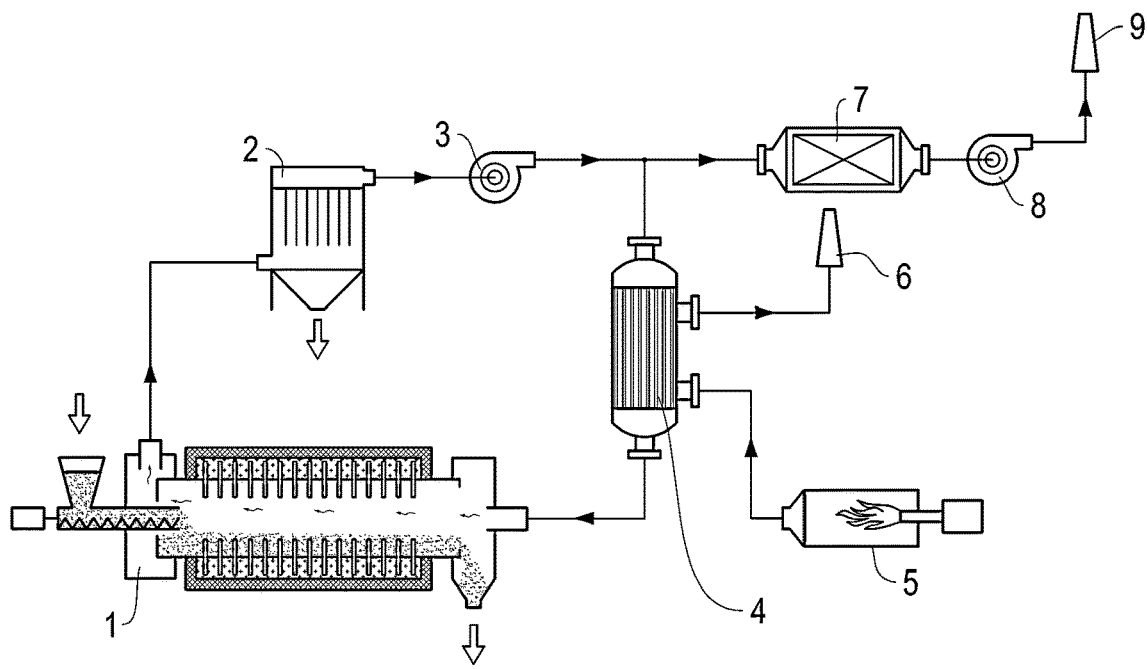
FIG. 1 is a flowchart of a heat pipe/ceramic heat accumulation type indirect thermal desorption-based soil remediation system.
Figure 2:
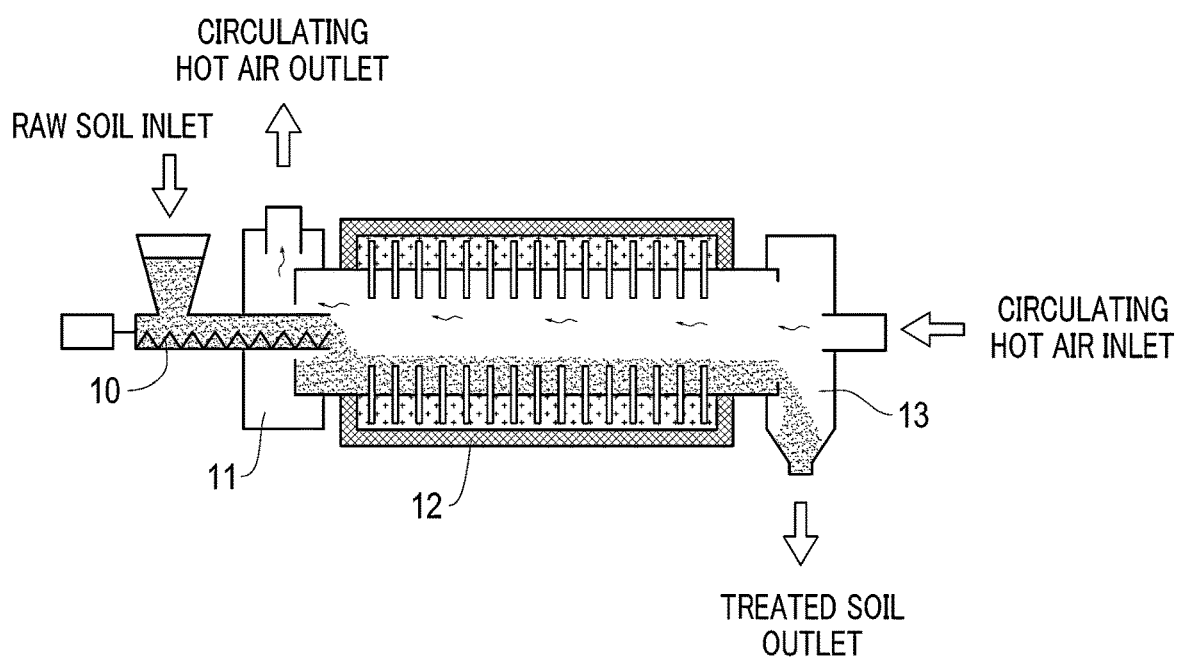
FIG. 2 is a schematic structural diagram of a thermal desorption reactor.
Figure 3:
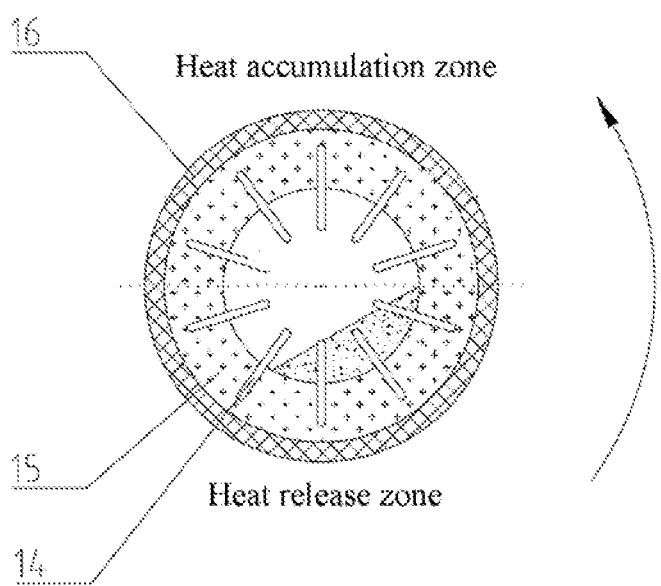
FIG. 3 is a schematic structural diagram of a cross section of a drum.

As shown in FIGS. 1-3, a heat pipe-enhanced heat accumulation type indirect thermal desorption-based soil remediation device is provided. The remediation device includes a thermal desorption reactor (1), a dust remover (2), a hot air circulating fan (3) and a hot air heater (4). The thermal desorption reactor (1) is sequentially connected with the dust remover (2), the hot air circulating fan (3) and the hot air heater (4) to form a hot air circulation loop. A combustion device (5) is sequentially connected with the hot air heater (4) and a chimney (6) to form a flue gas passage. An offgas purifying device (7) is sequentially connected with an induced draft fan (8) and an exhaust funnel (9) to form an offgas purifying passage.

The thermal desorption reactor (1) includes a feeding device (10), a feed end fixed hood (11), a drum (12) and a discharge end fixed hood (13). The feeding device (10), the drum (12) and the discharge end fixed hood (13) are sequentially communicated to form a soil channel. The feed end fixed hood (11), the drum (12) and the discharge end fixed hood (13) are sequentially communicated to form a hot air channel in the reactor. The hot air channel is communicated with the soil channel in the drum (12). The feeding device (10) is provided with a raw soil inlet. The feed end fixed hood (11) is provided with a circulating hot air outlet. The discharge end fixed hood (13) is provided with a circulating hot air inlet and a treated soil outlet. The drum (12) rotates around a central axis, and the rest parts are fixed.

An included angle between an axis of a drum body of the drum (12) and a horizontal plane is 1-6°. The drum (12) includes an outer heat insulation layer (16), an inner heat accumulator (15) and heat pipes (14) partially inserted into the heat accumulator (15). An inside of the heat accumulator forms a cylindrical cavity that is a space where circulating hot air undergoes heat transfer and thermal desorption reaction with soil. The heat pipes (14) are uniformly distributed along circumferential and axial directions of the drum body, and a distance between every two adjacent heat pipes is greater than a maximum particle size of the soil.

An inner cavity of the drum body of the drum (12) has a diameter of 1.5-2 m and a length of 8-12 m. The heat insulation layer has a thickness of 80-120 mm, the heat accumulator has a thickness of 20-30 cm, and the heat pipes (14) have a diameter of 2-5 cm, a length of 45-55 cm and a spacing of 1-15 cm. The heat accumulator is composed of alumina ceramics.

The heat pipe (14) is composed of a shell, a working fluid, a wick and an end cover. The inside of the pipe is evacuated into a negative pressure and then filled with a proper amount of the working fluid. Under the action of gravity, a lower end of the pipe is an evaporation heat absorption section and an upper end is a condensation heat release section. The functions of the two ends can be exchanged as the pipe is turned upside down. By utilizing the principle of heat conduction and the phase-change rapid heat transfer properties of the working fluid, the heat pipe is a heat transfer element whose heat conductivity exceeds the heat conductivity of any known metal. The shell is made of austenitic stainless steel, the working fluid is mercury, and a working temperature is 250-650° C.

Application Case:

The above system structure is adopted. The inner cavity of the drum body of the reactor has a diameter of 2 m and a length of 12 m. The outer heat insulation layer of the drum body has a thickness of 100 mm. The ceramic heat accumulator has a thickness of 25 cm. The heat pipes have a diameter of 3.2 cm, a length of 50 cm and a spacing of 10 cm. The shell of the heat pipe is made of austenitic stainless steel, the working fluid is mercury, and the working temperature is 250-650° C.

The temperature setting is as follows: the high-temperature flue gas at 1000° C. generated by combustion undergoes indirect heat exchange with the circulating hot air through the hot air heater such that the temperature drops to 300° C. The hot air temperature at the inlet of the hot air heater is 250° C., and the hot air temperature at the outlet is 600° C. The final heating temperature of the contaminated soil is 350° C.

A heat pipe-enhanced heat accumulation type indirect thermal desorption-based soil remediation method realized by using the above device is provided. Contaminated soil is conveyed by a feeding device to a feed end of a drum and heated in two manners. In the first manner, hot air at 600° C. from an outlet of a hot air heater enters the drum from a circulating hot air inlet of a discharge end fixed hood and transfers heat with the contaminated soil by direct countercurrent contact such that the contaminated soil is heated. In the second manner, a ceramic heat accumulator at a bottom of the drum releases heat through heat pipes such that the contaminated soil is heated. As the temperature of the contaminated soil gradually rises to about 350° C., water and organic contaminants in the soil are volatilized into a gaseous state and carry dust to become thermal desorption offgas that is separated from the solid soil, and the treated soil is discharged from a treated soil outlet of the discharge end fixed hood.

A cross section of the drum is divided into a heat release zone and a heat accumulation zone based on the horizontal line. A temperature of the ceramic heat accumulator located at the bottom heat release zone is higher than the soil temperature, and heat is transferred to the soil through the heat pipes such that the temperature drops to be close to the soil temperature. A temperature of the ceramic heat accumulator located at the top heat accumulation zone is lower than the hot air temperature, and the heat pipes transfer heat of the hot air to the ceramic heat accumulator such that the temperature of the heat accumulator rises to be close to the hot air temperature. As the drum rotates around a central axis, the ceramic heat accumulator performs heat accumulation and heat release cycles through the heat pipes such that the heat of the hot air is transferred to the soil, which is the second heating manner mentioned above.

The thermal desorption offgas generated by the contaminated soil being heated inside the drum of a thermal desorption reactor serves as an initial source of circulating hot air. The hot air flows from a circulating hot air outlet of a feed end fixed hood to a dust remover and is subjected to dust removal and driven by a hot air circulating fan, a large part of the hot air is heated to 600° C. by the hot air heater through indirect heat exchange, returns to the inside of the drum from the circulating hot air inlet of the discharge end fixed hood, transfers heat with the contaminated soil by direct contact while heating the ceramic heat accumulator through the heat pipes such that the temperature drops to 200-300° C., and carries thermal desorption gas generated by the contaminated soil being heated, a part continues to be reused in a hot air circulation loop, and the remaining part is discharged after being purified.

In the method, fuel is combusted in a combustion device to generate high-temperature flue gas at 1000° C., and the high-temperature flue gas undergoes indirect heat exchange with the circulating hot air through the hot air heater such that the temperature drops to 300° C., and then is discharged to the atmosphere from a chimney. The high-temperature flue gas does not directly contact the circulating hot air.

In the method, with continuous treatment of the soil, the thermal desorption offgas is generated continuously, the circulating hot air carries the thermal desorption offgas and is mixed with the thermal desorption offgas such that the amount of gas increases, 80% of the gas in the drum (12) is reused as the circulating hot air, and the remaining gas branches from the outlet of the hot air circulating fan and is discharged after being purified by an offgas purifying device.

In the method, a rotating speed is 5 r/min, and a soil filling factor in the drum body is 0.2.

The achieved effects are as follows: 20 tons of contaminated soil is remediated per hour, and a removal rate of the organic contaminants is 99% or above.

Comparative Embodiment 1

Except for the heat pipes and the ceramic heat accumulator, the other structures are the same as in Embodiment 1. The inner cavity of the drum body of the reactor has a diameter of 2 m and a length of 12 m, and the outer heat insulation layer of the drum body has a thickness of 100 mm.

The temperature setting is as follows: the high-temperature flue gas at 1000° C. generated by combustion undergoes indirect heat exchange with the circulating hot air through the hot air heater such that the temperature drops to 300° C. The hot air temperature at the inlet of the hot air heater is 250° C., and the hot air temperature at the outlet is 600° C. The final heating temperature of the contaminated soil is 350° C.

The achieved effects are as follows: 12 tons of contaminated soil is remediated per hour, and a removal rate of the organic contaminants is 99% or above.

Comparison Results

Treatment Effects of Embodiment and Comparative Embodiment

| Item | Embodiment 1 | Comparative Embodiment 1 |
|---|---|---|
| Diameter of inner cavity of drum body of reactor | 2 m | 2 m |
| Length of drum body of reactor | 12 m | 12 m |
| Volume of reactor | 37.8 m$^3$ | 37.8 m$^3$ |
| Contaminated soil remediated per hour | 18 tons | 12 tons |
| Heat transfer per hour | 3600 kw | 2160 kw |
| Heat transfer capacity per unit volume of reactor | 95.2 kw/m$^3$ | 57.1 kw/m$^3$ |

What is claimed is:

1. A soil remediation method, comprising:
   conveying soil by a feeding device to a feed end of a drum;

heating the soil by (i) introducing hot air at 550-650° C. from an outlet of an air heater into the drum from a circulating hot air inlet of a discharge end fixed hood and transferring heat with the soil by direct countercurrent contact such that the soil is heated, and (ii) releasing heat from a heat accumulator at a bottom of the drum through heat pipes such that the soil is heated, wherein, as a temperature of the soil gradually rises to about 300-500° C., water and organic contaminants in the soil are volatilized into a gaseous state and carry dust to become thermal desorption offgas that is separated from the soil, the thermal desorption offgas becoming part of the hot air and flowing from a circulating hot air outlet of a feed end fixed hood to a dust remover;

removing dust from the hot air by the dust remover;

driving the hot air by a hot air circulating fan, wherein (i) a first part of the hot air is heated to 550-650° C. by the air heater through indirect heat exchange, returns to the drum from the circulating hot air inlet of the discharge end fixed hood, transfers heat with the soil by direct contact while heating the heat accumulator through the heat pipes such that a temperature of the first part of the hot air drops to 200-300° C., carries additional thermal desorption gas generated by the soil being heated, and continues to be reused in a hot air circulation loop, and (ii) a second part of the hot air is discharged after being purified; and discharging the soil from a treated soil outlet of the discharge end fixed hood.

2. The soil remediation method according to claim 1, wherein a cross section of the drum includes a heat release zone below a horizontal line and a heat accumulation zone above the horizontal line, the heat accumulator being located at both the heat release zone and the heat accumulation zone, a temperature of the heat accumulator located at the heat release zone is higher than a temperature of the soil, and heat is transferred to the soil through the heat pipes such that the temperature of the heat accumulator drops to be close to the temperature of the soil; a temperature of the heat accumulator located at the heat accumulation zone is lower than a temperature of the hot air, and the heat pipes transfer heat of the hot air to the heat accumulator located at the heat accumulation zone such that the temperature of the heat accumulator located at the heat accumulation zone rises to be close to the temperature of the hot air; and as the drum rotates around a central axis, the heat accumulator performs heat accumulation and heat release cycles through the heat pipes such that the heat of the hot air is transferred to the soil.

3. The soil remediation method according to claim 1, further comprising:

combusting fuel in a combustion device to generate flue gas having an initial temperature of 950-1050° C., wherein the flue gas undergoes indirect heat exchange with the hot air through the air heater such that the temperature of the hot air drops to about 300° C., and discharging the flue gas to atmosphere from a chimney, wherein the flue gas does not directly contact the hot air.

4. The soil remediation method according to claim 1, wherein with continuous treatment of the soil, the thermal desorption offgas is generated continuously, the hot air circulates and carries the thermal desorption offgas and is mixed with the thermal desorption offgas such that an amount of the hot air increases, 60-90% of the hot air in the drum is reused as the first part of the hot air, and the second part of the hot air branches from an outlet of the hot air circulating fan and is discharged after being purified by an offgas purifying device.

5. The soil remediation method according to claim 1, wherein a rotating speed of the drum is 0.4-10 r/min, and a soil filling factor in the drum does not exceed 0.25.

6. A soil remediation device comprising:

a thermal desorption reactor including a drum, a feeding device that conveys soil to a feed end of the drum, a feed end fixed hood at the feed end of the drum, a discharge end fixed hood at a discharge end of the drum, a heat accumulator at a bottom of the drum, and heat pipes extending from the heat accumulator to an interior of the drum;

a dust remover;

a hot air circulating fan;

an air heater, the thermal desorption reactor being sequentially connected with the dust remover, the hot air circulating fan and the air heater to form a hot air circulation loop;

a chimney;

a combustion device that is sequentially connected with the air heater and the chimney to form a flue gas passage; and an offgas purifying device that is sequentially connected with an induced draft fan and an exhaust funnel to form an offgas purifying passage, wherein:

the soil remediation device is configured to heat the soil by (i) introducing hot air at 550-650° C. from an outlet of the air heater into the drum from a circulating hot air inlet of the discharge end fixed hood and transferring heat with the soil by direct countercurrent contact such that the soil is heated, and (ii) releasing heat from the heat accumulator at the bottom of the drum through the heat pipes such that the soil is heated, wherein, as a temperature of the soil gradually rises to about 300-500° C., water and organic contaminants in the soil are volatilized into a gaseous state and carry dust to become thermal desorption offgas that is separated from the soil, the thermal desorption offgas becoming part of the hot air and flowing from a circulating hot air outlet of the feed end fixed hood to the dust remover; the dust remover removes dust from the hot air;

the hot air circulating fan drives the hot air, wherein (i) a first part of the hot air is heated to 550-650° C. by the air heater through indirect heat exchange, returns to the drum from the circulating hot air inlet of the discharge end fixed hood, transfers heat with the soil by direct contact while heating the heat accumulator through the heat pipes such that a temperature of the first part of the hot air drops to 200-300° C., carries additional thermal desorption gas generated by the soil being heated, and continues to be reused in a hot air circulation loop, and (ii) a second part of the hot air is discharged after being purified; and the soil remediation device is configured to discharge the soil from a treated soil outlet of the discharge end fixed hood.

7. The soil remediation device according to claim 6, wherein an angle between an axis of the drum and a horizontal plane is 1-6°, the drum comprises an outer heat insulation layer, the heat accumulator, and the heat pipes partially inserted into the heat accumulator, an inside of the heat accumulator forms a cylindrical cavity that is a space where the hot air circulates and undergoes heat transfer and thermal desorption reaction with the soil, the heat pipes are uniformly distributed along circumferential and axial directions of the drum, and a distance between every two adjacent heat pipes is greater than a maximum particle size of the soil.

8. The soil remediation device according to claim 6, wherein (i) the feeding device, the drum and the discharge end fixed hood sequentially communicate to form a soil channel, (ii) the feed end fixed hood, the drum and the discharge end fixed hood sequentially communicate to form a hot air channel in the thermal desorption-reactor, (iii) the hot air channel communicates with the soil channel in the drum, (iv) the feeding device is provided with a raw soil inlet, and (v) the drum rotates around a central axis.

9. The soil remediation device according to claim 7, wherein an inner cavity of the drum has a diameter of 1.5-2 m and a length of 8-12 m; wherein the outer heat insulation layer has a thickness of 80-120 mm, the heat accumulator has a thickness of 20-30 cm, and the heat pipes have a diameter of 2-5 cm, a length of 45-55 cm and a spacing of 1-15 cm.

10. The soil remediation device according to claim 6, wherein the heat accumulator is composed of alumina ceramics, silicon nitride ceramics or silicon carbide ceramics.

* * * * *